March 24, 1964 — M. A. LEE — 3,125,845
SWATH GATHERING MECHANISM
Filed Feb. 24, 1961
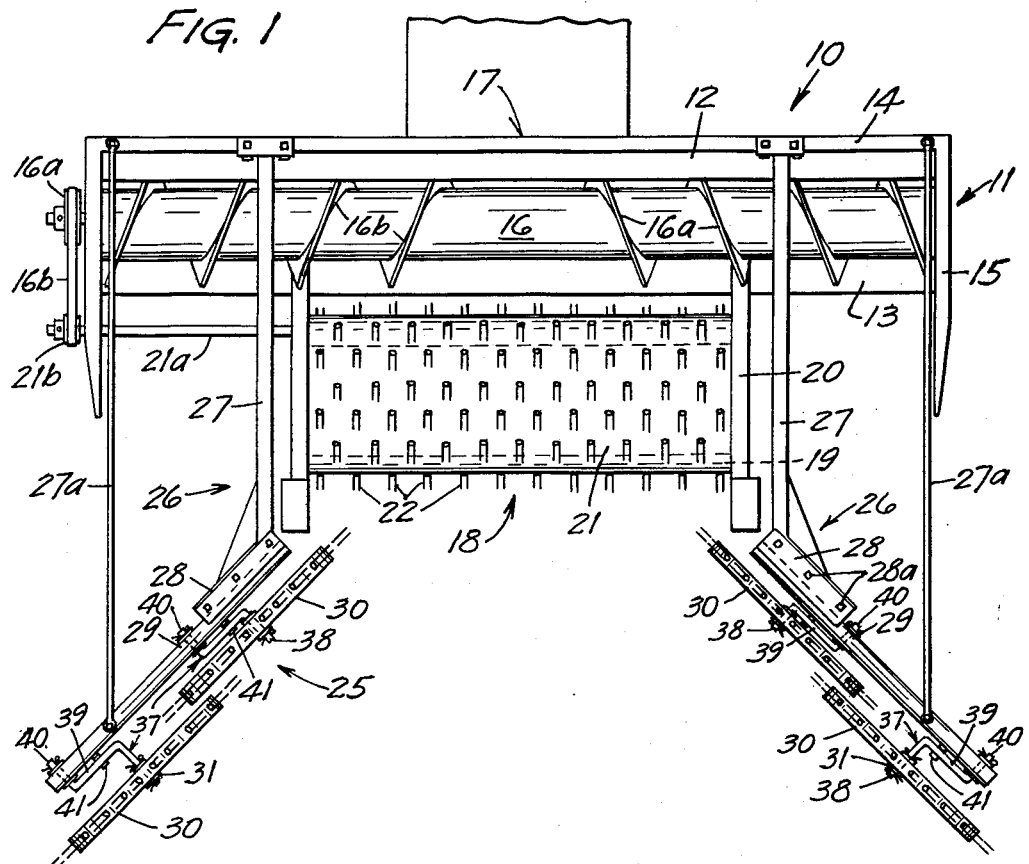
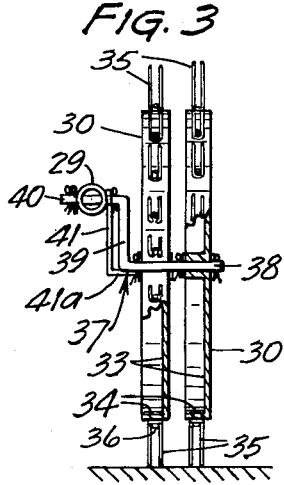
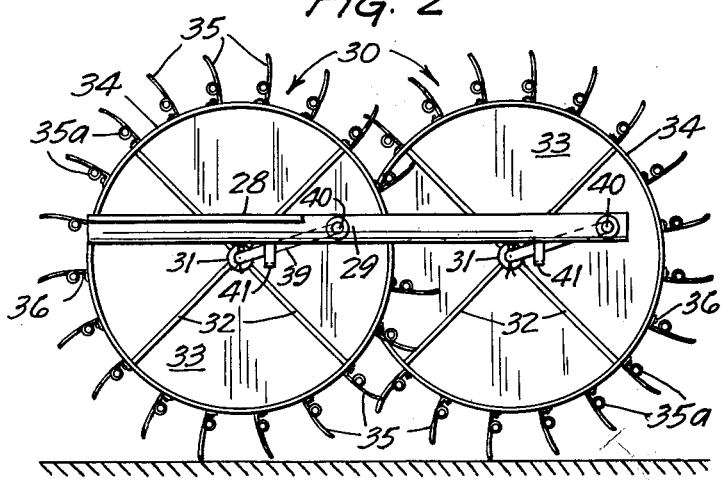
INVENTOR
MANCEL A. LEE
BY
Williamson & Palmatier
ATTORNEYS

United States Patent Office 3,125,845
Patented Mar. 24, 1964

3,125,845
SWATH GATHERING MECHANISM
Mancel A. Lee, Ellendale, N. Dak.
Filed Feb. 24, 1961, Ser. No. 91,391
2 Claims. (Cl. 56—364)

This invention relates to harvesting combines of the type having pick-up mechanisms for pick up and rearward delivery of previously cut granular crops and more particularly this invention relates to swath-gathering mechanism for use in facilitating pick up of the cut granular crops by a conventional combine.

In many areas of the country, granular crops are harvested in a two step operation in which the first step consists in cutting and simultaneously windrowing the stalks, the windrows normally extending longitudinally of the cutting operation. The windrowed granular crops are left upon the ground to allow the grain, soy beans, stalks, hay or other farm products to age so that the grain and food seeds may mature and properly dry prior to the second step. The second step involves the picking up of the previously cut granular crops which are then subjected to a threshing operation through the mechanisms employed in modern combines or harvesting machines. It has been found that rain and wind quite often cause the windrowed granular crops to become disseminated and scattered throughout the field, thus interferring with the second step of the harvesting operation.

Even though many of the modern harvesting combines utilize pick-up mechanisms for facilitating pick up of the previously cut granular material, when the crops have been subjected to wind, rain and the like and after the crops have become scattered or settled then a great deal of the crops are missed by the harvesting combine and these portions of the crop must thereafter be picked up manually by workmen or there will be a noticeable loss in the crop yield.

My invention is directed towards overcoming these problems.

The general object of this invention is the provision of a conventional harvesting combine with a swath gathering mechanism which through the use of greatly increases the efficiency of such a harvesting combine.

Another object of this invention is the provision in a conventional harvesting combine of the type having a pick-up mechanism with a novel swath gathering apparatus of highly efficient but simple construction, which is arranged and constructed to cooperate with the conventional pick-up mechanism with a novel swath gathering apparatus of highly efficient but simple construction, which is arranged and constructed to cooperate with the conventional pick-up mechanism so that scattered cut granular crops may be efficiently and effectively picked up by the harvesting combine thereby greatly precluding crop loss and also substantially reducing the cost of labor normally attendant with harvesting operations wherein the previously cut granular crops have been scattered by the action of rain, wind and the like.

A further object of my invention is the provision in a conventional harvesting combine of the type having a pick-up mechanism with a swath gathering apparatus including crop directing wheel members disposed adjacent opposite sides and forwardly of the combine for positively directing the crops inwardly of the pick-up mechanism so that a much wider swath of cut granular crops may be efficiently picked up without altering the basic construction of the conventional harvesting combine.

These and other objects and advantages of my invention will more fully appear from the following description made in connection with the accompanying drawings wherein like character references refer to the same or similar parts throughout the several views, and in which:

FIG. 1 is a fragmentary diagrammatic plan view of the front portions of a conventional harvesting combine incorporating my invention.

FIG. 2 is a side elevational view on an enlarged scale of a portion of the mechanism comprising my invention; and FIG. 3 is an end elevational view of the parts illustrated in FIG. 2.

Referring now to the drawing, it will be seen that the front portion of the threshing machine such as a harvesting combine, designated by the reference numeral 10, as illustrated in FIG. 1. Although the drawing does not illustrate the complete and entire construction of the harvesting combine 10, it is pointed out that the embodiment illustrated in FIG. 1 is of the self-propelled type although my invention may be used equally well with tow-type combines 10. The combine 10 is provided with the conventional ground-engaging wheels (not shown) and will also be provided with the internal mechanisms including conveyor means, threshing cylinder, straw walkers, fan and separator shoes all of which are conventional in combines and do not constitute any part of the present invention.

Means are also provided for feeding a granular crop into the combines and in the instant embodiment the feed delivery means includes a center delivery auger type feed platform. It is to be understood that the term granular crops is intended to include soy beans, peas, grass and the like as well as barley, etc. Referring again to FIG. 1, it will be seen that the center delivery feed platform includes a housing 12 having a substantially flat bottom wall 13 with a substantially vertically disposed rear wall 14 rigidly connected therewith. End walls 15 are rigidly connected to the opposite ends of the rear wall 14 and extend upwardly from and are connected with the bottom wall 13 so that the housing defined by these wall elements is of the open top type. An elongated auger 16 has its opposite ends thereof journalled in the end walls 15 and is positioned within the housing 12 for feeding grain into the interior of the combine 10. It will be noted that the auger 16 is of the centered delivery type and includes an end section 16a with a flight of helical conveyor blades directing a granular crop inwardly from the right. The auger 16 also includes an end section 16b wherein the flight of helical conveyor blade directs the granular crop inwardly from the left as viewed in FIG. 1. Thus, it will be seen that the granular crop will be continuously fed towards the center of the housing 12 so that the material will be discharged to a feed opening or inlet 17 formed in the rear wall 14 of the housing 12 and communicating with the interior of the combine.

The material discharged into the feed opening 17 will be conveyed upwardly and rearwardly by the conventional conveyor mechanism to the threshing cylinder which is disposed in cooperating relation with a conventional concave grate as is well known in the art to effect separation of most of the grain from the straw or stalks. The straw will be conveyed rearwardly from the threshing cylinder to be discharged rearwardly from the combine while the granular material will be subjected to subsequent air separation by means of a separator shoe mechanism so that the chaff material is removed from the granular crop. The foregoing described structure, although not shown, is conventional and common to conventionally constructed combines and a detail showing thereof is thought to be unnecessary in the instant application.

In many parts of the country the granular crops will be cut and windrowed rather than have the granular crops cut and thereafter immediately fed into the combine for complete separation of grain from stalks. In the operation wherein the granular crops are windrowed, these crops are allowed to lay for several days in order to permit the crops to completely mature. To facilitate pick-up of these windrowed crops, a pick-up mechanism 18 is provided and which is positioned forwardly of and in cooperating relation with respect to the center delivery auger platform 11. Although there are other kinds of pick-up mechanisms, the one employed in the instant application is of the belt type and includes a supporting frame 19 having attachment brackets 20 connected therewith and extending rearwardly therefrom for connection to the center delivery platform housing 12. The pick-up mechanism frame 19 is provided with an endless substantially flat belt or apron 21 mounted on rollers (not shown) to be rotated thereby. The belt 21 is provided with a plurality of rigid finger elements 22 fixedly connected to the outer surface thereof and which project outwardly therefrom. The finger elements 22 are preferably formed of rigid metallic material such as steel or the like and when the endless conveyor belt 21 is moved the finger elements 22 engage the granular crop for urging the granular crop rearwardly towards the center delivery auger type platform 11.

Sometimes the windrowed crops are subjected to the action of wind and rain and become spread over the field or else become matted so that pick up of all of the cut granular crops is difficult even with a pick-up mechanism. When traversing a field in which the windrowed crops have been spread, a great deal of the granular crops will be missed by the combine thus necessitating manual pick up of these crops which is very time consuming and of costly operation. Even then the crop yield will be reduced so all of the granular crop material cannot be picked up. To overcome this problem and to provide efficient pick up of the cut granular crops, I have provided a swath gathering mechanism 25 which, as best seen in FIG. 1, includes a pair of support structures 26 each mounted on opposite sides of the center delivery auger platform 11. Each of these support structures 26 includes an elongate attachment bar 27 attached to its rear end portion to the housing 12 and which projects forwardly therefrom. Each of the support structures 26 also includes a bracket 28 detachably connected to the attachment bar 27 by ready detachable bolt means 28a, the attachment bar and bracket each being suitably apertured. It will be noted that the bracket 28 is disposed in angulated relation with respect to the attachment bar 27 and that the bracket is provided with a plurality of apertures to permit ready adjustment of the bracket relative to the attachment bar. Each of the support structures 26 also includes an elongate tubular mounting element 29 rigidly connected to its associated bracket 28 by means of welding and the like and the tubular mounting elements 29 each provide means for attachment of the crop-directing, ground-engaging wheel members associated therewith. A brace member 27a is also provided for each support structure 26 and serves to impart rigidity to the outer end of its associated support.

Referring now to FIG. 2 it will be seen that each of the support structures 26 is provided with a plurality of ground-engaging, crop-directing wheel members 30 and each of which includes a hub 31 having a plurality of spiders or spokes 32 rigidly connected therewith and radiating outwardly therefrom. A plate 33 is connected to the hub and spokes and presents a substantially flat face the purpose of which will become more apparent hereinbelow. Each of the wheel members 30 is also provided with an annular rim 34, the latter having a plurality of circumferentially spaced and radially extending tines or crop-engaging elements 35 rigidly secured thereto. It will be noted that the crop-engaging elements 35 are rigidly interconnected to the rim 34 by means of bolts 36 and that each tine is provided with a spring loop 35a so that these tines have a spring-like action even though the tines the constructed of a metallic material such as steel or the like.

Each of the wheel members 30 is mounted on its associated support structure 26 by means of an axle member 37 also clearly seen in FIG. 1 and FIG. 2. These axle members 37 are each arranged and constructed so that the wheel members associated therewith will have a free floating action and each includes a wheel member-engaging portion 38 upon which its associated wheel member is journalled. Each axle member 37 also includes a transverse portion 39 disposed in angular relation with a tubular mounting element 29 and which terminates in an offset portion 40 which extends through its associated mounting element 29 for pivotal movement relative thereto.

It will, therefore, be seen that because of the pivotal connection of the offset portion 40, the wheels are attached to the respective mounting members 29 for relatively free floating movement when the combine is traversing the ground. In order to permit the center delivery auger type platform 11 to be elevated for transport, means are provided for limiting downward pivoting movement of the respective axle members 37 and to this end each axle member has associated therewith a stop element 41 as best seen in FIG. 2.

It will be noted that these stop elements 41 have an axle-engaging portion 41a which projects forwardly therefrom and is adapted to be engaged by the transverse portions of each axle member upon downwardly pivotal movement of the latter. Thus, downward pivoting movement of each of the axle members is limited.

It will also be noted that the wheel members are disposed in substantially vertical planes at an acute angle with respect to the line of travel of the machine. Actually, the wheel members 30 are disposed in angulated relation with respect to the line of travel of the machine and preferably at an angle between 30° and 45°. It will also be noted that in the embodiments shown, a pair of wheel members 30 are provided for each support structure 26 and that these wheel members are arranged in sets with their respective axes of rotation converging forwardly with respect to the axes of rotation of the opposite set of wheel members.

In operation, the combine will be moving in a forward direction and the auger mechanism 16 will also be simultaneously driven by suitable driving means (not shown). The auger 16 has a pulley 16a affixed thereto and the pick-up mechanism 18 has a laterally projecting shaft 21a, the outer end of which carries a pulley 21b. A belt 16b is trained around the pulley 16 and 21b provides a driving connection between the auger and pick-up mechanism.

The endless belt type pick-up mechanism 18 will also be rotating and the cooperation of the fingers 22 therewith will direct the cut granular crop rearwardly into the auger housing 12 for subsequent delivery therewith into the combine. The ground-engaging, crop-directing wheel members will be in rolling engagement with the ground surface and each will rotate about its respective axes. Rotation of each of the wheel members 30 will be in a direction so that the particular direction of the under-passing arc of rotation will be towards the combine and the crop-engaging elements will engage the crop and positively direct the cut granular crop rearwardly and inwardly towards the pick-up mechanism thus insuring constant delivery of the cut granular crops to the pick-up mechanism and the center delivery auger platform 11. With this arrangement, the cut crops are positively and effectively fed into the combine even though such crops are no longer disposed in windrows but are spread and matted which is a common condition when the cut crops are subjected to the action of wind and rain and the like.

Referring to FIG. 1, it will be noted that through the use of my swath gathering mechanism a much larger swath of cut crop may be picked up by the combine without increasing the size of the center delivery platform or the pick-up mechanism.

It will, therefore, be seen from the foregoing description that I have provided a novel swath gathering mechanism for use with conventional combines and which is arranged and constructed to greatly increase the effectiveness of the conventional combines without requiring any alterations of the basic structure. It will also be noted from the preceding paragraphs that my novel swath gathering mechanism not only permits efficient effective pick up of the cut granular crops which may be scattered by wind action or the like but also permits a much larger amount of material to be picked up more efficiently with one traversing pass of the combine.

It has been found that through the use of my device, crops yields are not only noticeably increased but that there is a great saving in labor and time since the need for manual labor associated with the scattering of windrowed corps is obviated.

Thus, it will be seen that I have provided a novel swath gathering mechanism which is not only of simple and inexpensive construction but which functions in a more efficient manner than any heretofore known comparable devices.

It will, of course, be understood that various changes may be made in the form, details, arrangement and proportions of the various parts without departing from the scope of my invention.

What is claimed is:

1. In combination with a harvesting combine of the type having a pick-up mechanism mounted at the front end thereof for pick-up of cut granular crops and rearward delivery thereof to the conventional transversely disposed platform conveyor mechanism, swath gathering mechanism for engaging and directing cut granular crops inwardly towards the pick-up mechanism and including a pair of elongate mounting elements rigidly mounted at opposite sides of the combine and projecting forwardly and laterally outwardly therefrom, a pair of axle members each being pivotally connected to one of said mounting elements for pivotal movement about a horizontal axis and in a vertical plane relative thereto, each of said axle members including an intermediate offset portion extending substantially parallel with its associated mounting element and terminating in an outer free end portion projecting forwardly of said intermediate portion, a pair of ground-engaging crop directing wheel members each being freely revolvable on the outer end portion of one of said axle members for free revolving movement relative thereto so that the axes of rotation of said wheel members converge forwardly whereby forward movement of the harvesting combine will cause said wheel members to rotate and thereby engage and direct the cut granular crops rearwardly and inwardly towards the pick-up mechanism.

2. The structure as defined in claim 1 and stop means on each of said mounting elements and being engageable by said intermediate offset portion of each axle member to limit downward pivotal movement of the latter.

References Cited in the file of this patent

UNITED STATES PATENTS

| | | |
|---|---|---|
| 2,683,345 | Meyer | July 13, 1954 |
| 2,731,782 | Mason | Jan. 24, 1956 |
| 2,783,606 | Wilson | Mar. 5, 1956 |
| 2,845,769 | Hintz et al. | Aug. 5, 1958 |
| 2,893,537 | Krahn | July 7, 1959 |